United States Patent [19]

Rejsa

[11] 4,018,325
[45] Apr. 19, 1977

[54] AUTOMATIC PACKAGE ACCUMULATOR

[75] Inventor: Jack J. Rejsa, Golden Valley, Minn.

[73] Assignee: The Pillsbury Company, Minneapolis, Minn.

[22] Filed: Oct. 9, 1975

[21] Appl. No.: 621,189

[52] U.S. Cl. .............................. 198/347; 198/796; 214/16.4 C; 312/268

[51] Int. Cl.² ........................................ B65G 43/08

[58] Field of Search ............ 312/268; 198/37, 154, 198/140, 796, 347; 214/16.4 C, 16.4 R

[56] References Cited

UNITED STATES PATENTS

| | | | |
|---|---|---|---|
| 1,020,746 | 3/1912 | Dehler | 198/154 |
| 1,736,866 | 11/1929 | Wagner et al. | 198/154 |
| 3,749,228 | 7/1973 | Magaldi | 198/140 X |
| 3,842,963 | 10/1974 | Kemper | 198/140 X |

Primary Examiner—Evon C. Blunk
Assistant Examiner—Douglas D. Watts
Attorney, Agent, or Firm—James V. Harmon; Michael D. Ellwein

[57] ABSTRACT

An automatic article surge accumulator is described which has an inlet for the articles, an outlet spaced from the inlet and a plurality of moveable shelves between the inlet and the outlet. Each shelf can store one or more of the articles. The shelves are moveable so that after one shelf is full, a new shelf shifts into position to receive one or more additional articles. Associated with the shelves is a device for shifting the articles to a releasing position so that they are able to move to the outlet when a demand is made for an additional article.

6 Claims, 6 Drawing Figures

AUTOMATIC PACKAGE ACCUMULATOR

FIELD OF THE INVENTION

The invention relates to package handling equipment and more particularly to an accumulator for storing articles which make up the contents of the package when there is a surge in the quantity of articles produced.

THE PRIOR ART

No commercially available equipment is known that can be used for accumulating articles such as packages e.g. pouches of food that are to be placed in a carton. When a single pouch of food is to be placed in a carton there is no surge problem caused by the starting and stopping of the filling and loading machines since all of the machines can be started and stopped depending upon whether the pouch is ready to be placed in the carton. However, where a plurality of different articles are to be placed in a carton one example of which is a pouch of cake filling, a pouch of cake swirl mix and a pouch of frosting contained in a single paperboard carton, the carton cannot be filled as easily as one containing a single article since the carton cannot be filled unless all of the articles are present. In the past, the accumulation and filling of the cartons has been done by hand. The excess articles whatever they may be were used in a typical filling line.

SUMMARY OF THE INVENTION

An automatic article surge accumulator is described which has an inlet for the articles, an outlet spaced from the inlet and a plurality of shelves between the inlet and the outlet. Each shelf can store one or more of the articles. The shelves are preferably moveable so that after one shelf is full, a new shelf shifts into position to receive one or more additional articles. Associated with the shelves is a means for shifting the articles to a releasing position so that they are able to move to the outlet when a demand is made for an additional article. Preferably, those that enter first are discharged first.

In accordance with the present invention, accumulators in a package filling line automatically balance the flow of a plurality of different articles simultaneously. One accumulator is provided for each of the different articles to be placed in a box, carton or other package and each accumulator is supplied with a varied number of identical pouches or other articles in its storage shelves. In a preferred form of the invention, there is a first or incoming set of storage shelves and a second outgoing or discharge set of shelves and a means for transferring the articles from the incoming shelves to the outgoing shelves. When an article is to be discharged, the outgoing shelves are allowed to empty and the articles that are emptied then flow for example by gravity to a loading station or loading conveyor.

THE OBJECTS

The main objects are to provide a package accumulator having the following characteristics and advantages: (a) the ability to accumulate up to about 500 articles and to discharge them as needed, (b) the ability to handle delicate pouches of food without damaging or distorting them, (c) a minimum floor space requirement, (d) to accept pouches at the rate they are manufactured, (e) deliver at a rate required by the downstream packaging machine, (f) receive and discharge packages by gravity, (g) allow speed changes in the article making machinery to regulate the quantity stored in the accumulator and (h) to provide an article for one that was removed for some reason, e.g. because it was defective or off in weight.

THE FIGURES

DESCRIPTION OF THE PREFERRED EMBODIMENT

Figures 1, 2:
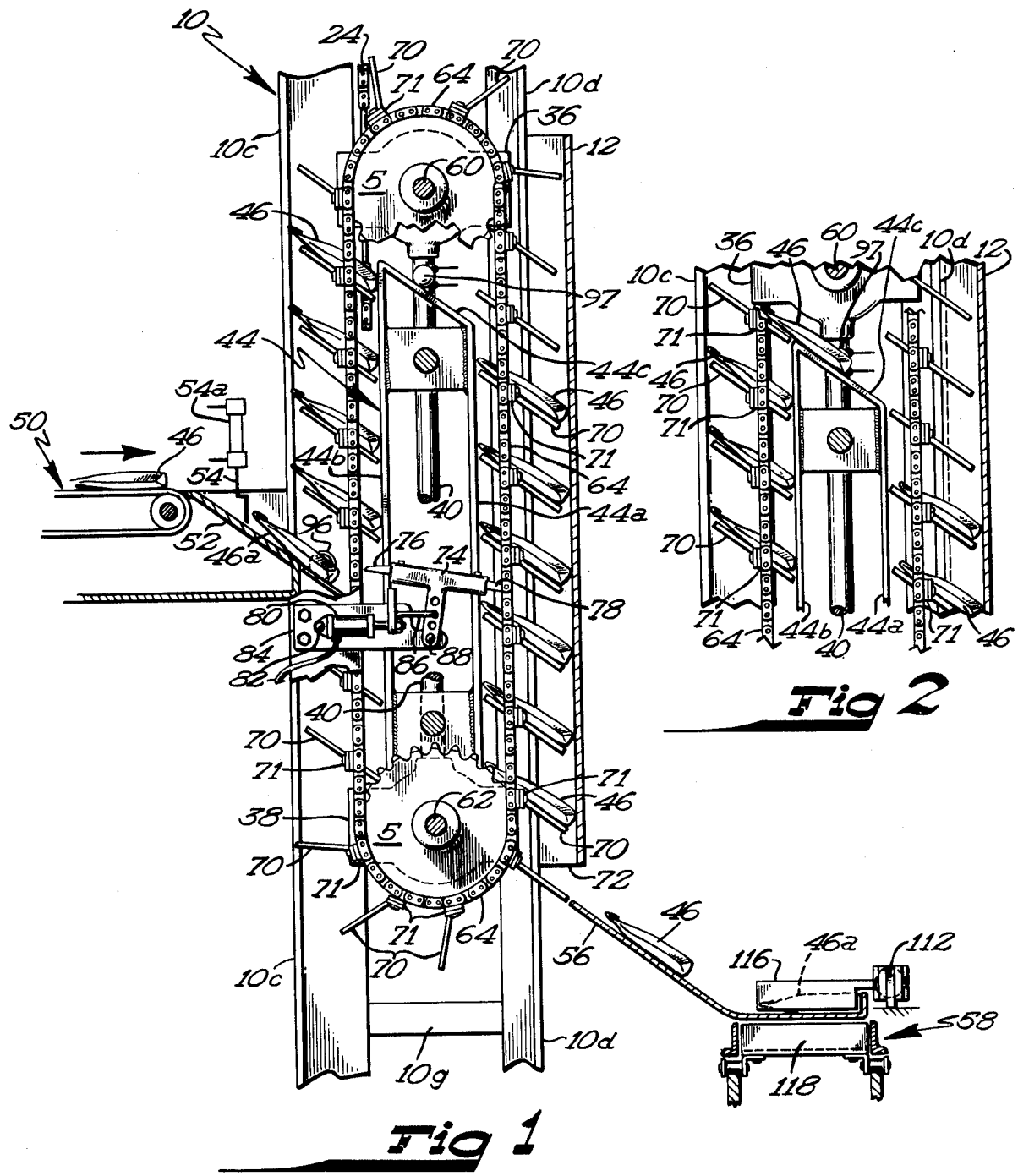
FIG. 1 is a partial side elevational view of the apparatus and associated conveyors feeding articles into and out of the accumulator.
FIG. 2 is a partial vertical sectional view of the accumulator of FIG. 1 showing an article transferring from the incoming storage shelves to the outgoing storage shelves.
Figure 3:
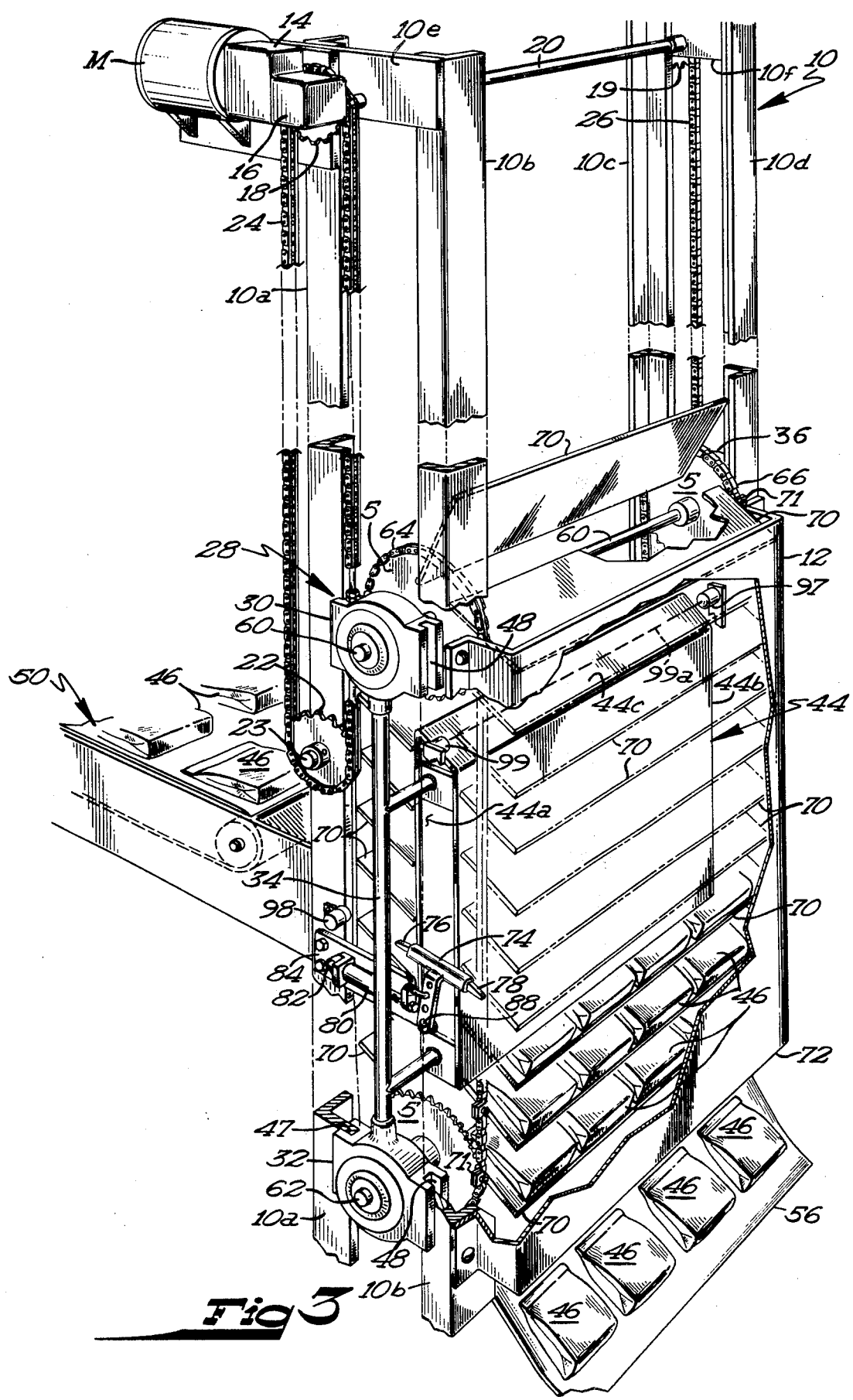
FIG. 3 is a perspective view of the apparatus partly broken away.

The major parts of the apparatus which are best seen in FIGS. 1 and 3 include a supporting framework 10 made up of four vertically disposed columns 10a, 10b, 10c and 10d formed from angle irons suitably connected together at their upper and lower ends by cross pieces 10e, 10f, 10g, and by a vertically disposed, transversely extending sheet metal plate 12 which is generally C-shaped as seen from above and is affixed along its vertically disposed marginal edges with suitable fasteners to the columns 10b and 10d. The plate 12 functions as a fixed stop for the articles that pass through the accumulator as will be described below.

A reversible indexing drive comprising a motor M and an index mechanism 14 is rigidly connected to the upper end of the framework 10 and is coupled via gear box 16 to a drive sprocket 18 which when the motor M is actuated, moves in either a clockwise or a counter-clockwise direction through an arc of a selected length and then stops.

A similar sprocket 19 on the right hand side of the apparatus as seen in FIG. 3 is driven from the gear box 16 via shaft 20. An idler sprocket 22 is mounted on the end of an idler shaft 23 journaled for rotation on columns 10a. Another idler sprocket 20 (FIG. 6) is mounted on a shaft journaled for rotation on the frame member 10c coaxial with shaft 23. Drive chains 24 and 26 are entrained between each vertically related pair of sprockets 18, 22 and 19, 22 respectively and each of the chains 24 and 26 is in turn connected respectively to one side of an article storage framework indicated generally by the numeral 28. The framework 28 includes a vertically disposed pair of bearings 30 and 32 on the left hand side of the apparatus (FIG. 3) which are connected by a tubular frame member 34 and a similar pair of bearings on the right hand side of the apparatus, only the upper one of which 36 is shown in FIG. 3. The lower one 38 appears in FIG. 1. The right side bearings 36 and 38 are also connected together rigidly by vertically disposed tubular frame member 40 (FIG. 1) and the frame members 34 are in turn rigidly connected by short sections of horizontally disposed tubing to a moveable stop 44 which includes vertically disposed transversely extending sheet metal walls 44a and 44b and a top wall 44c which is inclined downwardly proceeding from the inlet to the outlet side as a apparatus as seen in FIG. 1 and functions of the slide surface as shown in FIG. 2 for each of the articles 46 when one of the shelves to be described below passes upwardly beyond the upper edge of the top wall 44c. Each of the bearings 30–32 and 36–38 is provided with vertically disposed slots 47 and 48 that are just the proper size to slide on the columns, flanges and allow the entire framework 28 to slide up and down the columns 10a, 10b, 10c and 10d when the drive motor M is actuated.

An endless belt in-feed conveyor 50 shown in FIG. 1 and FIG. 3 conveys the articles 46 that are to be packaged from left to right in the figures to a feed chute 52 where the articles are allowed to slide under the influence of gravity against a hydraulically or electrically operated gate 54 which when opened allow one or more of the packages as shown at 46a in FIG. 1 to slide down a chute 52 onto one of the shelves described below. The articles 46 are laid out in transversely extending rows and each of these rows enters the accumulator at the same time when the gate 54 is lifted.

Cylinder 54a connected to the gate 54 is operated either by a timer (not shown) which is connected thereto or by a physical connection with the motor as shown by a dotted line 54b so that the gate opens for half a second each time the motor M has indexed one space forward thereby allowing the pouches that are held by the gate 54 to fall to the desired position on the incoming shelf 70 which is then in alignment with the chute 52.

Figure 5:
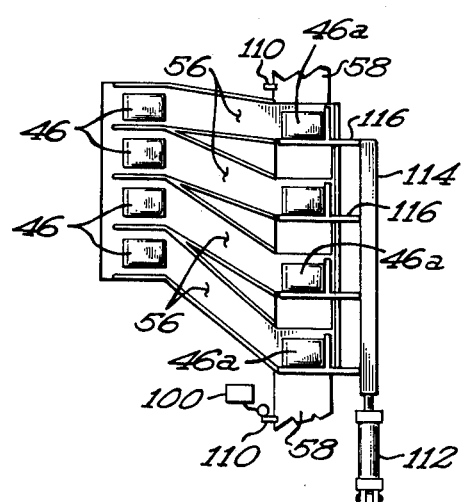
FIG. 5 is a partial plan view of the article discharge chutes and the bucket conveyor loader.

Outlet or take-away chutes 56 which are inclined at about a 45° angle to the vertical and spread apart further at their lower ends than at their upper ends, as seen in FIG. 5, convey the articles being packaged to a take-away bucket conveyor 58 (FIGS. 1 and 5).

Journaled for free rotation between bearings 30 and 36 and between bearings 32 and 38 respectively, are horizontally disposed transversely extending sprocket shafts 60 and 62 which have transversely spaced sprockets 5 secured to each end. Over the sprockets 5 are entrained pairs of vertically disposed laterally spaced drive chains 64 and 66. Secured to these chains are vertically spaced apart, normally diagonally inclined article supporting shelves 70. The shelves 70 are fastened to the endless chains 66 and 64 with brackets 71 which are secured to certain ones of the links. The shelves form left and right stacks which define incoming and outgoing shelves respectively. Each shelf 70 extends laterally in a horizontal plane and is mounted with the edge facing the inlet at a higher elevation than the edge facing the outlet. The shelves 70 are spaced apart at uniform intervals such as every four inches. It will be seen that the left edges of the shelves 70 on the left side of the apparatus as seen in FIGS. 1 and 3 are in a position to pass close to the lower end of the chute 52 to receive the articles 46 as they slide from the chute. The left (upper) edges of the shelves in the column closest to the outlet are spaced relatively close to the vertically disposed wall 44a of the moveable stops 44 and their lower edges are spaced relatively close to the plate 12 which acts as a fixed stop to hold the articles in place on the shelves until the shelf moves below the lower end 72 of the stop at which point they are released and allowed to slide down the appropriate chute 56.

A chain lock or clamp 74 has left and right side teeth 76 and 78 engaging the left or right hand sides of the chain 64 as controlled by a cylinder 80. The cylinder 80 is mounted by means of a bolt or pivot pin 82 on a support bracket 84 that is bolted to the frame 10 and is connected via actuator arm 86 to the lock 74 which is pivoted at 88 to the bracket 84. In operation, depending upon the condition of cylinder 80, either tooth 76 or tooth 78 will be locked in the left or right side respectively of the chain 64 so that counterclockwise rotation of the sprocket 18 with a lock 74 is shown in the figures will cause the incoming shelves 70 to move upwardly and the shelves on the right to remain still. On the other hand, with the tooth 76 engaged when the sprocket 18 travels in a clockwise direction, the incoming shelves 70 at the left will be stationery and those on the right will move down.

Figure 4:
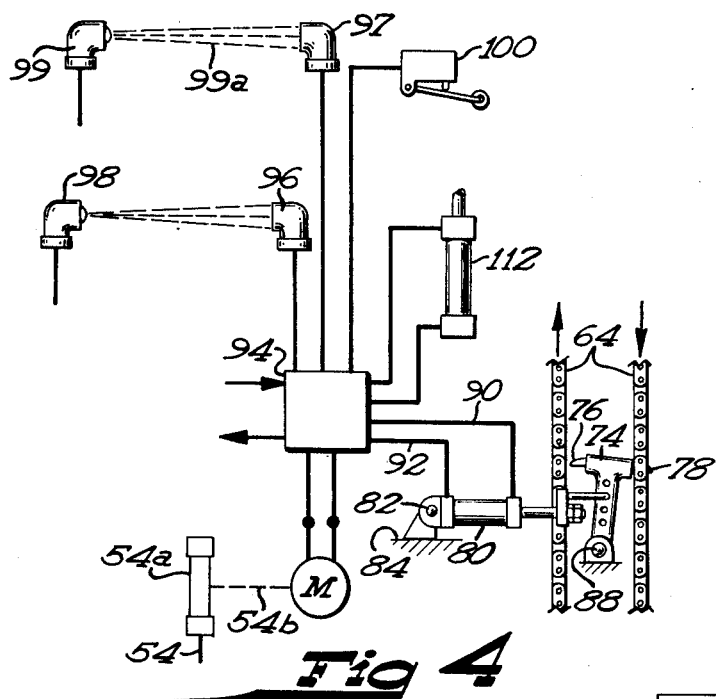
FIG. 4 is a diagram of the photocell and limit switch controls.

As shown in FIG. 4, the air cylinder 80 is connected via hydraulic lines 90 and 92 to an electrohydraulic controller 94 of suitable known construction which is in turn actuated by a photocell 96 cooperating with light 98 and a limit switch 100. The controller 94 is connected to the actuator 80 and the motor M in such a way that the motor M always travels in a clockwise direction with the actuator 80 retracted locking the left hand side of the chain 64 and in a counterclockwise direction only when the actuator 80 is extended to the position of FIG. 4 locking the right hand side of chain 64. This causes the chains 64 and 66 to always travel in a clockwise direction as seen in the figures and never in the counterclockwise direction as the framework 28 travels up and down.

The second photocell 97 which is actuated by a lamp 99 is also connected to the controller 94. The photocell 97 is mounted rigidly upon the framework 28 just above the inclined slide surface 44c to operate with a lamp 99 that is secured rigidly to the opposite side of the framework to shine an actuating beam 99a across the top of the slide surface 44c to detect any pouches that jam on the slide surface. When the beam 99a is interrupted by a pouch that is jammed in place, the indexing drive for motor M is disabled. Since both the lamp 98 and photocell 96 are mounted on the framework 10, the horizontal beam from lamp 98 is stationary with respect to the framework and the in-feed conveyor 50 so that the beam is interrupted each time one or more of the pouches slides down a ramp 52 and onto whichever one of the shelves 70 which is in place to receive it. This produces the in-feed signal which extends the cylinder 80 thereby moving the tooth 78 into the section of chain 64 to the right in the figure and causing the index drive motor M to advance one step turning the sprocket 18 in a counterclockwise direction just a sufficient distance to move the stop 44 upwardly one half the vertical distance between the shelves 70. Thus, the stepping or index distance of the drive motor M and its associated chains and sprockets is one half the vertical distance between the shelves 70.

The vertical distance between each shelf e.g. four inches will hereinafter be referred to as the shelf spacing which is the same as two times the index distance of the index drive 14.

Figure 6:
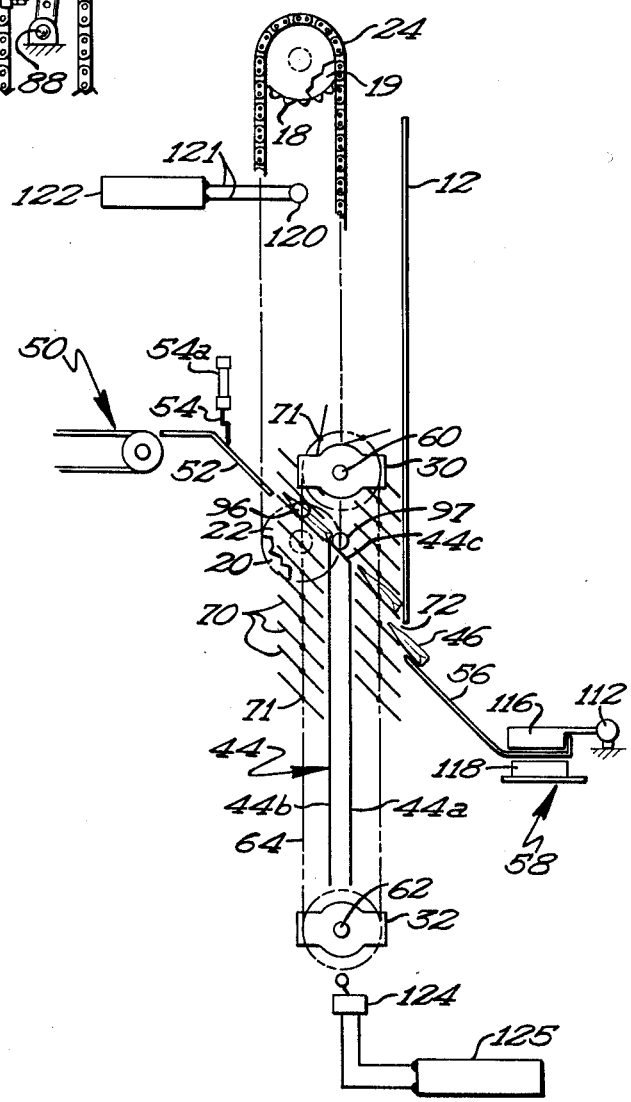
FIG. 6 is a semi-diagrammatic side elevational view of the apparatus showing relative positions of the in-feed and feed-out conveyors with respect to the temporary storage shelves.

The limit switch 100 which is connected to the controller 94 is positioned as shown in FIG. 5 adjacent to the bucket conveyor 58 so that its operating finger will be struck by tabs 110 which are mounted on the conveyor 58 adjacent every fourth bucket. The closing of limit switch 100 as every fourth bucket passes, actuates an advance and retract stroke of cylinder 112 which is connected to an arm 114 having pouch engaging plates 116 that slide pouches 46a into buckets 118 (FIG. 1). The closing of limit switch 100 (a) retracts cylinder 80 causing tooth 76 to engage a left hand section of chain 64 and (b) simultaneously causes drive motor M to turn the sprocket 18 in a clockwise direction one step. This lowers the pouches on one of the shelves 70 downwardly beyond the lower end 72 of the stop 12 allowing the whole row of pouches to slide down chute 56 into the discharge position adjacent the plates 116. Two other electrical actuators are provided, first a cooperating lamp and photocell 120 in position to detect the pouches and shelves when they get to the top of their limit of travel and by supplying a signal to stop the upstream filling equipment 122 as shown in FIG. 6 and second, a limit switch 124 mounted on the framework in position to detect the shelves when they get close to the bottom of their limit of travel. Switch 124 is connected as seen in FIG. 6 to downstream equipment such as the cartoning apparatus to shut down the cartoning apparatus when the accumulator is empty and the shelves have reached their lowermost position. The photocell 120 and the limit switch 124 provide means for protecting against overloaded or underloaded conditions of the accumulator by either shutting down upstream or downstream equipment respectively, when the accumulator is overly full or almost empty.

In operation, the incoming shelves 70 on the left in the figures always travel upwardly while the outgoing shelves on the right in the figures always travel downwardly because when the chain 24 and sprocket 18 move in a counterclockwise direction, the tooth 78 is engaged in the right-hand run of chain 64 thereby causing shelves 70 at the left to be loaded one after the other whereas when sprocket 18 moves in a clockwise direction the portion of chain 24 at the right travels downwardly along with bearing 30 while the tooth 76 holds the left side of chain 64 stationary causing the shelves 70 at the right in the figures to travel downwardly one space at a time. In this way, the pouches or articles are loaded when sprocket 18 travels in a counterclockwise direction and unloaded when sprocket 18 travels in a clockwise direction. It will be seen that the pouches are only present on the part of the accumulator above a line between chute 52 and chute 56. All of the shelves below this line are empty.

In a typical layout several of the accumulators are used adjacent to one another in a single location and each receives a different article. For example, one accumulator may receive pouches of cake mix, an identical machine next to it may receive pouches of frosting for the cake mix. Each of the accumulators is positioned to feed articles along its own outlet chute 56 onto the same bucket conveyor 58. Let us assume a first machine fills each bucket with a pouch of cake mix. The buckets 118 then travel either by continuous motion or by interrupted motion to the second such accumulator whereupon when signal is produced by the tab 110, the pouches of frosting drop into the same buckets that already contain cake mix. The buckets ultimately empty into a carton filling apparatus of suitable known construction (not shown) so that each pair of articles, that is to say, one pouch of cake mix and one pouch of frosting mix are dumped into the same carton. If the frosting filling machine is shut down or stops for one reason or another, the accumulator holding the frosting will continue to feed the frosting containers in synchronization with those fed from cake mix pouch accumulator by maintaining the tooth 76 in engagement with its chain 64 and the sprocket 18 running in a clockwise direction ahead one space each time the tab 110 strikes the limit switch 100. This causes the actuator 112 for each accumulator to be actuated thereby pushing both the cake mix and the frosting mix into one of the buckets. The cake mix accumulator which is receiving as much cake mix as it needs will be filling and dumping alternatively because the cylinder 54a will be actuated every time the motor M causes the accumulator shelves to be advanced one step thereby sending a signal via channel 54b (FIG. 4) to the gate dumping product into an incoming shelf 70. When an accumulator is dumping product but is not receiving any, the sprocket 18 will only move intermittently in a clockwise direction rather than moving alternately in opposite directions. The accumulator will continue to operate this way until all the product has been dumped. The carton filling machine will be shut off when the lower end of the accumulator framework 28 strikes the limit switch 124 of FIG. 6. Additional accumulators can be provided on a single bucket conveyor line for example, four accumulators of a kind described can be used simultaneously to feed the same bucket conveyor. In this case each bucket in the carton bucket conveyor passes each of the four accumulators in succession. As each bucket passes the succeeding accumulators, it receives another in succession. As each bucket passes the succeeding accumulators, it receives another article, for example, in the first accumulator it might receive a package of chocolate cake base, in the next a package of coconut cake swirl mix, in the third a package of cake glazing and in the fourth a package of cake icing. All of the packages in the bucket are then transferred to a cartoning machine of suitable known construction which placed the four packages in the same carton. The carton filling apparatus which is not shown in the drawings operates continuously. In a typical application using four accumulators, the first two accumulators can be used to fill alternate groups of eight buckets on the carton bucket conveyor while the third and fourth accumulators fill every eight bucket group provided they are already filled by the first and second accumulator. The filling by the first two accumulators can be accomplished by a timing mechanism or by a photoelectric sensor placed by the bucket conveyors or both. If the third and fourth units run near empty and their infeeding conveyors are stopped then the first two accumulators are suitably wired to the limit switch 124 of the latter two units so as to stop when they are nearly empty. If the first two accumulators are completely empty, the second two will not discharge. When any accumulator is more than half full, its filling machine and incoming conveyors run at slow speed and when less than half full its filling machine and incoming conveyors run at a fast speed. When the accumulator is full, the filling machine and incoming conveyors both stop.

What is claimed is:

1. An article accumulator for temporarily storing articles being packaged comprising a supporting framework, two vertical stacks of uniformly spaced apart temporary storage shelves, comprising an incoming stack of shelves and an outgoing stack of shelves, infeed means operatively associated with the incoming stack to guide the articles coming into the apparatus onto the incoming stack, means operatively associated between the stacks for transferring articles from the incoming stack to the outgoing stack and means operatively associated with the outgoing stack to transfer the first article placed in the outgoing stack out of the apparatus upon a demand signal, the incoming shelves are inclined at an oblique angle with respect to the vertical, temporary stop means is operatively associated with the lower side thereof to prevent the articles from passing off the shelves and a means is provided for establishing relative vertical motion between the temporary stop and the incoming shelves to cause a shelf upon a demand signal to be located above the upper edge of the temporary stop whereby the articles in the incoming stack slide under the influence of gravity to the outgoing stack of shelves.

2. The apparatus of claim 1 wherein all of the shelves are inclined at an oblique angle proceeding downwardly from the inlet side of the apparatus to the outlet side of the apparatus and the shelves are mounted on a shelf framework having a temporary stop means mounted thereupon and a slide surface on its upper edge which is also inclined downwardly proceeding from the inlet side of the apparatus toward the outlet side of the apparatus to allow articles to slide from the inlet shelves thereacross to the outlet shelves when an inlet shelf with articles is elevated above the slide surface.

3. The apparatus of claim 1 wherein a bucket conveyor is operatively associated with the guide means that feeds the articles out of the apparatus to receive the articles therefrom and a moveable pusher arm is mounted adjacent the bucket conveyor to load articles into the buckets.

4. An article accumulator for temporarily storing articles being packaged comprising a supporting framework, two verticle stacks of uniformly spaced apart temporary storage shelves, comprising an incoming stack of shelves and an outgoing stack of shelves, infeed means operatively associated with the incoming stack to guide the articles coming into the apparatus onto the incoming stack, means operatively associated between the stacks for transferring articles from the incoming stack to the outgoing stack and means operatively associated with the outgoing stack to transfer the first article placed in the outgoing stack out of the apparatus upon a demand signal, the outgoing shelves are positioned on an inclined angle with respect to the vertical proceeding downwardly toward the outlet side of the machine, a temporary stop having a lower edge is provided to hold the articles on the outgoing shelves and a means is provided for establishing relative vertical motion between the temporary stop and the outgoing shelves whereby the articles are free to slide off the outgoing shelf and out of the apparatus when the outgoing shelves are below the lower edge of the temporary stop.

5. An article accumulator for temporarily storing articles being packaged comprising a supporting framework, two vertical stacks of uniformly spaced apart temporary storage shelves, comprising an incoming stack of shelves and an outgoing stack of shelves, infeed means operatively associated with the incoming stack to guide the articles coming into the apparatus onto the incoming stack, means operatively associated between the stacks for transferring articles from the incoming stack to the outgoing stack and means operatively associated with the outgoing stack to transfer the first article placed in the outgoing stack out of the apparatus upon a demand signal, the stacks of shelves are mounted upon an endless chain means entrained over vertically spaced apart sprockets journaled for rotation upon laterally extending vertically spaced apart axels mounted upon a shelf supporting framework, means is provided for locking incoming or outgoing portions of said chain and means is provided for raising and lowering the shelf framework with either the incoming shelves or the outgoing shelves and the associated portion of the chain means held stationary by said locking means.

6. An article accumulator for temporarily storing articles being packaged comprising a supporting framework, two vertical stacks of uniformly spaced apart temporary storage shelves, comprising an incoming stack of shelves and an outgoing stack of shelves, infeed means operatively associated with the incoming stack to guide the articles coming into the apparatus onto the incoming stack, means operatively associated between the stacks for transferring articles from the incoming stack to the outgoing stack and means operatively associated with the outgoing stack to transfer the first article placed in the outgoing stack out of the apparatus upon a demand signal, the shelves are supported upon an endless chain, a locking means is pivotally mounted between a portion of said chain secured to the incoming shelves and a portion of the chain secured to the outgoing shelves, an actuator means is provided for moving the lock to engage and hold stationary either the incoming shelves or the outgoing shelves whereby moving the shelf supporting framework upwardly raises the incoming shelves when the lock engages the outgoing shelf portion and lowering the shelf framework lowers the outgoing shelves when the lock engages and holds the incoming shelf portion stationary.

* * * * *